(12) United States Patent
Sallam

(10) Patent No.: US 6,421,232 B2
(45) Date of Patent: Jul. 16, 2002

(54) DUAL FPD AND THIN CLIENT

(75) Inventor: Hussein Sallam, Clarkesville, MD (US)

(73) Assignee: Xybernaut Corporation, Fairfax, VA (US)

( * ) Notice: Subject to any disclaimer, the term of this patent is extended or adjusted under 35 U.S.C. 154(b) by 0 days.

(21) Appl. No.: 09/825,410

(22) Filed: Apr. 3, 2001

Related U.S. Application Data

(63) Continuation-in-part of application No. 09/630,474, filed on Aug. 2, 2000.

(51) Int. Cl.[7] .................................................. H05K 5/00
(52) U.S. Cl. ...................... 361/681; 361/679; 361/826; 709/236; 345/326
(58) Field of Search ............................... 361/679–687, 361/724–727, 752, 755, 796, 826, 827; 364/709.11; 709/236; 345/326

(56) References Cited

U.S. PATENT DOCUMENTS

| | | | | |
|---|---|---|---|---|
| 5,115,375 | A | * | 5/1992 | Hongoh ....................... 361/681 |
| 5,205,244 | A | | 4/1993 | Newman et al. |
| 5,208,736 | A | * | 5/1993 | Crooks et al. .............. 364/681 |
| 5,625,829 | A | | 4/1997 | Gephardt et al. |
| 5,632,020 | A | | 5/1997 | Gephardt et al. |
| 5,692,199 | A | * | 11/1997 | Kikinis et al. .............. 395/733 |
| 5,708,840 | A | | 1/1998 | Kikinis et al. |
| 5,768,095 | A | | 6/1998 | Nakamura et al. |
| 5,844,824 | A | | 12/1998 | Newman et al. |
| 6,049,831 | A | | 4/2000 | Gordell et al. |
| 6,052,120 | A | | 4/2000 | Nahi et al. |
| 6,181,284 | B1 | * | 1/2001 | Madsen et al. ............. 343/702 |
| 6,309,230 | B2 | * | 10/2001 | Helot .......................... 361/683 |

* cited by examiner

*Primary Examiner*—Darren Schuberg
*Assistant Examiner*—Hung Van Duong
(74) *Attorney, Agent, or Firm*—James J. Ralabate

(57) ABSTRACT

The invention is essentially a flat panel display, preferably for use with wearable computers, which utilizes a display which is separate from the CPU, which can perform as a static flat panel display when connected to or in communication with the computer, but can also function as a thin client PDA when independent from the computer to which it was originally connected. The device will look and function as a flat panel display and include integral activation means either through stylus, touch panel, integrated pointing device, voice, or other activation means. This activation means will be available whether the device is functioning as a display or as a thin client PDA. The device will be small enough to be worn, carried or otherwise supported by the user, but can be utilized independently as a PDA to perform data input, calendars and scheduling, memo inputting and other thin client functions, and will run a thin client operating system such as Windows® CE or Palm® OS. The enclosure itself will contain hardware sufficient to support display functions as well as a thin client motherboard. It will also contain either a wired or wireless communication bus for communicating data to the computer from which it was disconnected. Additionally, it will possess a standard or proprietary video input plug for displaying output from the underlying computer.

11 Claims, 3 Drawing Sheets

DUAL FPD AND THIN CLIENT INVENTION

The invention is essentially directed to the field of computer displays with integral computer hardware. The invention functions as a computer display and portable thin client computer. This application is a continuation-in-part of co-pending patent application Ser. No. 09/630,474 filed in the U.S. Patent and Trademark Office Aug. 2, 2000.

BACKGROUND OF THE INVENTION

Modern flat panel display's (herein after "FPD's") with integral computer motherboards are now commercially available and widely used in the market place. These devices, sometimes termed web pads or tablets, are essentially FPD's with computer hardware integral to the enclosure housing the display so that the user can hold an entire computer in his hand that looks like a thick laptop display. These devices suffer from the limitation that they are generally sealed enclosure computers so that the monitor and the computer are inextricably tied together, without easy upgradability of one or the other. There are also various FPD's which are merely static displays, outputting information from a separate CPU enclosure which is the standard computer display configuration. These devices may or may not have the ability to receive input via a touch screen, attached or integrated mouse, stylus or like input device. A limitation of these devices is that they only serve one primary purpose which is to display information.

Also, well known in the computer arts are various "thin client systems" which have integral displays. Examples of such are the Palm Corporation's PALM PILOT series of personal digital assistants (PDA's), the CASSEOPIA by Casio Corporation, and the VISOR series of PDA's by Handspring Corporation. Typically these device will have a microprocessor which runs at a speed of 30 to 100 MHz and will run a limited capability operating system such as PALM OS or Microsoft WINDOWS CE. They are usually able to communicate with a personal computer to synchronize data and documents but are generally not capable of running robust software applications such as can be run on the personal computer. These devices capably perform their thin client functions, however, as much of the cost of these devices is derived from the creation of the display, they are not able to be fully utilized by plugging them into a wearable, portable or desktop computer to allow them to function as a standard VGA or other type resolution monitor in addition to being a thin client computer.

In the prior art, there exists several examples of computer systems which can be removed from a host computer. For instance, the devices described above, PDA's, now frequently include a data bus for synchronizing data collected with software applications running on a standard computer, or "fat client", and also allow the fat client to download information and sometimes even programs to the PDA, however, the PDA does not function as a flat panel display for the computer itself. For purposes of this disclosure the term fat client will include, wearable computers, desktop PC's, Apple computers, server computers, or any other standard computer which is capable of running a full functionality operating system.

Gephart et al, U.S. Pat. Nos. 5,625,829 and 5,632,020 assigned to Advanced Micro Devices, Inc., teach a dockable computer system which contains two distinct processors in a portable computer as well as in a host station. The processors are capable of independent and simultaneous processing. The dockable computer system preferably includes a communication channel for transmitting multi-processing support signals between the portable computer and the host station. This differs from the disclosure of the present invention in that the portable computer is not a thin client PDA with integral flat panel display. Also, the invention of Gephart is a system for multi-processing rather then a system which takes a display and adds thin client functionality with wired or wireless communication between the thin client and the computer from which it was disconnected.

Kinkini et al, U.S. Pat. Nos. 5,692,199 and 5,708,840 assigned to Elonex I. P. Holdings, Ltd., teaches a micro personal digital assistant and interconnect bus respectively. The '199 patent discloses a PDA which interfaces via a docking station with a fat client computer. When this happens, the processor of the PDA is automatically disabled so that the CPU of the fat client can access information stored in the PDA. This differs from the disclosure of the present invention in that the thin client does not perform as the primary display device for the computer from which it was disconnected. The present invention is designed specifically to enhance functionality of wearable computers such that a person not requiring all the functionality of the wearable computer can merely remove the display device and have a thin client computer and then reconnect it when he is finished.

Thus, there exists a need for a FPD device which overcomes the limitations of the prior art as disclosed above. It must be small enough to be carried or worn independently, but when unattached from its base computer, can perform thin client operations, and when reconnected to the computer from which it was previously attached, can function as a static display. In addition, any information acquired or maintained by the thin client should be available to the base computer when it is reattached to or in communication with the FPD

SUMMARY OF THE INVENTION AND PREFERRED EMBODIMENT

It is therefore an object of this invention to provide an apparatus which is devoid of the aforementioned deficiencies.

It is also an object of this invention to provide a display which can operate as a thin client computer when it is detached from its underlying computer.

Another object of this invention is to provide a flat panel display which contains integral hardware to support thin client operations.

Still a further object of this invention is to provide a computer display with built in two way communications capability.

Yet another object of this invention is to provide a display which performs as a static display when connected to a computer, but also functions as a thin client computer when disconnected from a computer.

Still yet another object of this invention is to provide a display with integral input means such as touch screen activation, stylus activation, voice responsive activation, pointing device activation, or other activation means.

These and other objects of this invention are accomplished generally by a flat panel display which contains integral hardware to support thin client functions and is capable of functioning as such when not functioning as a static computer display.

The present invention overcomes the aforementioned limitations of the prior art through the creation of a dual purpose thin client flat panel display, herein after TCFPD. For the purposes of this disclosure and claims, the term thin client will be taken to mean palm top computer, hand held computer, personal digital assistant or other limited functionality hand held computer which may rely on another computer for running applications and processing power. The TCFPD is essentially a standard FPD, which in its normal mode of operation, that is when connected to a fat client, performs as any other FPD or monitor would. For the purposes of this disclosure and claims the term fat client will be taken to mean a computer such as a PC, wearable computer, note book computer or other general or specific purpose computer system. The FPD displays standard VGA, SVGA, or other computer output signals and is optionally responsive to touch screen, stylus, voice, or point device input. However, when detached from the fat client computer's video signal, relying on its integral thin client motherboard and hardware, the TCFPD is able to function as a thin client with integral display capable of running a thin client operating system such as Windows® CE or Palm® OS or similar limited capability OS, and their respective applications. These applications are usually non-computationally intensive and perform tasks such as simple data or form entry, scheduling, and data collection. Additionally, the TCFPD will optionally have capability for wireless transmission of data obtained when in thin client mode to a base computer whether it be a wearable or any other fat client or server computer. The system uses either BlueTooth, IrDA, or other wireless digital transmission protocol(s) to eliminate the cable connecting the display to the wearable PC when used in the thin client mode or can optionally transfer data via a wired connection. When the FPD is reconnected to the base computer or fat client, its thin client OS is automatically or selectively disabled and it becomes a display device for the fat client.

The invention basically integrates the functionality of a thin client into a traditional flat panel display. One of ordinary skill in the art will appreciate that while a flat panel display is specifically recited, a head mounted display, wrist mounted display, or other body worn display which while different in form factor, are functionally equivalent, built around substantially identical technology and may be substituted for the flat panel display of the present invention. The display device, when connected to a computer and receiving computer output signals, will look and function as would any FPD and will have resolution capabilities consistent with state of the art displays of the same size and function. It may optionally be responsive to input from a touch screen, a stylus, voice, or other wired or wireless pointing means, or possess other input or activation means. However, when disconnected from the computer, the FPD becomes a self contained thin client device or TCFPD. Presumably, the same aforementioned input devices or activation means will work when the device is operating in the thin client mode. The TCFPD will house in its enclosure two sets of hardware. Firstly it will have hardware which is necessary to support video display display resolutions consistent with state-of-the-art flat panel displays including VGA and SVGA. Secondly, it will possess hardware, including a motherboard, sufficient to support thin client functionality. For a definition of thin client functionality, refer to "Personal Digital Assistants: A Comprehensive Guide to the Mobile User Technology," Raymond Wenig, McGraw-Hill Companies, 1996 and "Thin Clients Clearly Explained," Joseph Sinclair, Morgan Kaufmann Publishers, Jul. 1999. For the purposes of this disclosure and claims hardware necessary to support video display may include electronics and a video graphics board such as those manufactured by ATI or Creative Labs, and based on an architecture such as that manufactured by NVIDIA and hardware sufficient to support thin client functionality may include and hardware sufficient to support thin client functionality may be comprised essentially of a bus, static and/or dynamic memory, a central processor, I/O hardware, and an embedded or physically removable operating system, hereinafter OS.

The OS will be embedded in a ROM, PROM, EPROM or like data storage structure or could reside on a fixed or removable storage media. The OS could be Microsoft Windows® CE, Palm® OS, or other known or previously undeveloped embedded thin client OS or any future such OS. The enclosure will also contain a wireless data transmitter/receiver technology such as Bluetooth, IrDA, or other digital wireless data transfer protocol(s) for communicating to the base computer (fat client) when operating in thin client mode.

When the flat panel is reconnected to the computer from which is was originally detached, the on-board processor of the TCFPD can be selectively or automatically disabled or used as a support processor. This computer could be a PC, server, wearable or other computer and is capable of running state-of-the-art desktop operating systems such as Win98, WinNT, Win2000, Linux, UNIX, Solaris, etc. and their corresponding applications. By the term wearable computer is a meant a computer such as the one disclosed in U.S. Pat. Nos. 5,305,244 and 5,844,824. The disclosure of these commonly assigned patents is hereby incorporated by reference. However, the TCFPD, when in thin client mode, is capable of selectively communicating with the base computer so that information which was acquired by the thin client FPD can be transferred to the computer without having to re-power it or restart any of its applications. The dual purpose TCFPD can be used selectively with any PC or server computer as long as a wire can be connected between the two or wireless communications can be established.

The invention will be of particular use to wearable computers and/or other wearable electronic information appliances as well as current manufactures of PDA's wishing to broaden their customer base. An wearable computer example is the wearable computer manufactured by Xybemaut Corporation of Fairfax, Va. which is commercially marketed under the name Mobile Assistant®, and covered by U.S. Pat., Nos. 5,305,244 and 5,844,824 among others. This invention will extend the flexibility of such a computer by providing thin client functionality as well as full computing functionality. In this embodiment, the FPD can be separated from the wearable computer, used for data acquisition, static form entry, or other specific thin client applications and then rejoined with the computer. While disconnected, it will be running on battery power or plugged into an AC power or DC power outlet. The benefit of this is that the user need only carry one component of the wearable system, namely the TCFPD to perform low level computer functions. Given the immense popularity of thin client PDA's, owners and users of wearable computers will be able to enjoy the benefits of having one without having to buy an additional redundant piece of hardware. When the user is finished with his thin client task, and the FPD is rejoined with the wearable, it can communicate any appropriate data it acquired via any protocol for digital wireless data transfer, or via a cable such as IEEE 1334, serial, parallel, or USB port which would require complementary connectors to exist on the wearable and on the TCFPD. The wearable will have a digital wireless receiver or a physical data port for communicating and receiving data from the TCFPD and software to support this data reception if wireless transmission is to be used. Such software programs and wireless communication protocols are well known in the computer arts. Exemplary protocols include but are not limited to IrDA, BlueTooth, RF, 802.11, etc.

DETAILED DESCRIPTION OF THE INVENTION

Figure 1:
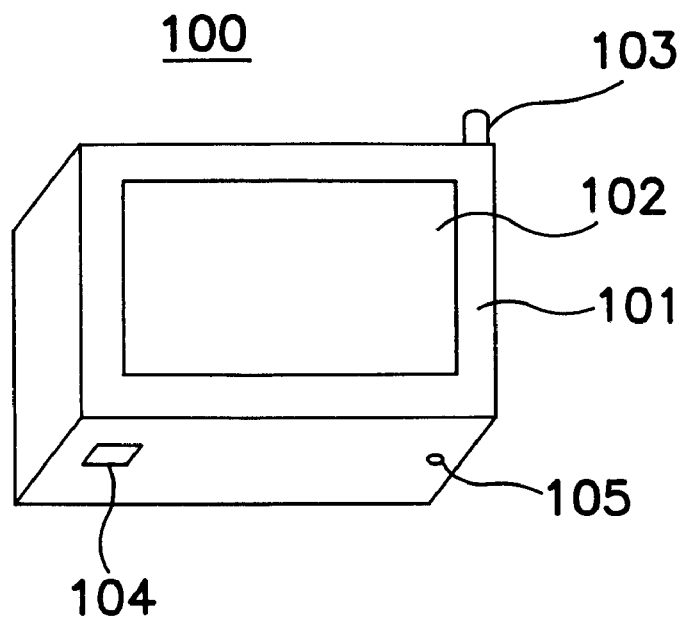
FIG. 1 illustrates a front view of the present invention.

Discussion of the invention will now be made with specific reference to the drawing figures. FIG. 1 illustrates an external view the TCFPD 100 of the present invention. The TCFPD 100 is encased in a durable enclosure 101, preferably composed of a durable lightweight material such as plastic or thin metal. There is a display screen 102 viewable from the front of the TCFPD 100. The display screen 102 will be capable of display resolutions and brightness consistent with state-of-the art display screens. There is a small antenna 103 for wireless communication with a personal computer. Alternatively, the antenna may be internal to the device or another wireless protocol such as IRdA may be utilized which does not require an antenna. The device 100 has an connector 104 preferably located in an unobtrusive position on the case 101 for connecting to the video output of a computer. Additionally, the device 100 has plug 105 for receiving electrical input to recharge the device's 100 battery and/or provide power to the device 100.

Figure 2:
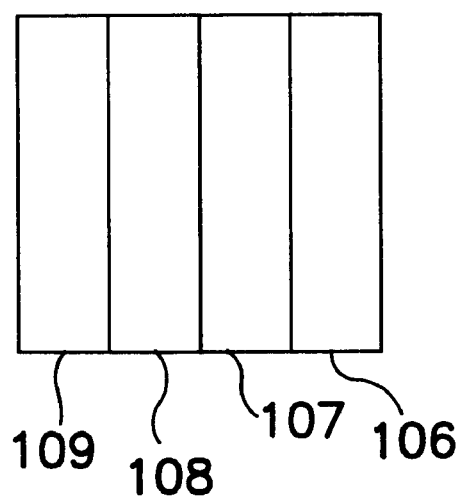
FIG. 2 illustrates a side view of the present invention showing the various layers of a preferred embodiment of the present invention.

FIG. 2 illustrates a side view of the device 100 not drawn to scale to illustrate the various component layers. Layer 106, the front end of the device contains the display screen 102 and case 101. The next layer 107 contains the hardware necessary to support the display screen 102. In the current market, these display screens and hardware are getting increasingly thin and may be contained in the same layer. The next layer, the thin client layer 108, contains the hardware necessary to support thin client operations including the thin client motherboard. Thin client operations typically include appointment book and calendar, document processing, contact information, email, games, etc. The final layer, the power supply layer 109, is the attached battery for the device 100. This battery may be removable so that it can be replaced by another fresh battery or it may be affixed to the case 101 in a substantially permanent manner. One of ordinary skill in the art will understand and appreciate the order and number of layers is not critical to the invention but rather the functionality afforded by them.

Figure 3:
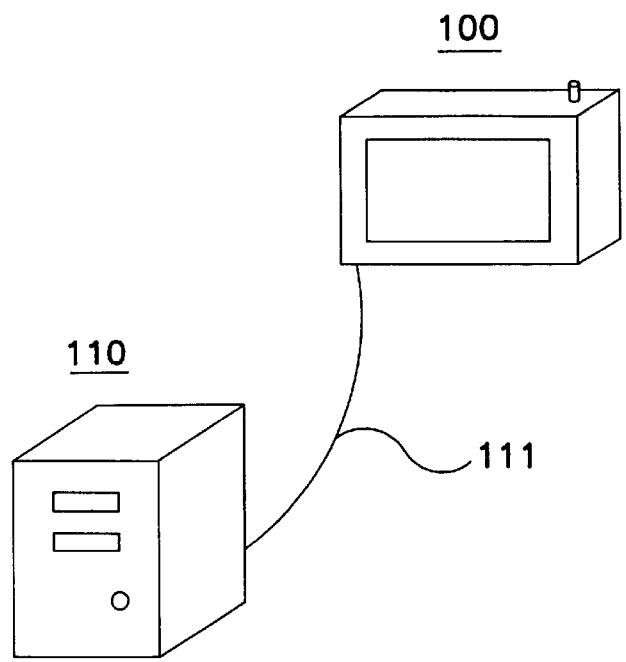
FIG. 3 illustrates a tethered embodiment of the TCFPD of the present invention including a personal computer.
Figure 4:
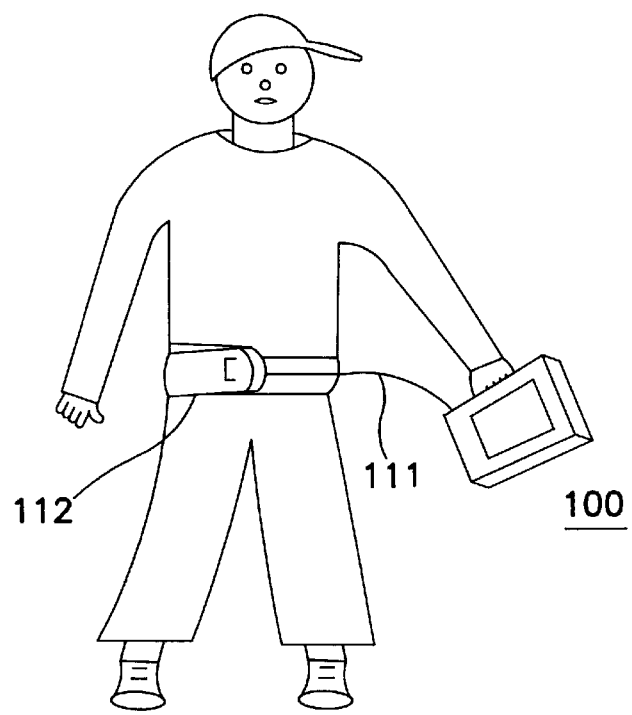
FIG. 4 illustrates a tethered embodiment of the TCFPD of the present invention including a wearable computer.

FIG. 3 and FIG. 4 illustrate two embodiments where the TCFPD 100 of the present invention is used as a primary display device for a computer. FIG. 3 illustrates a desktop computer 110, where by the display is connected to the computer via a hardwire connection 111. FIG. 4 illustrates a wearable computer environment whereby the underlying computer 112 is worn or supported on the body of a user. The TCFPD 100 can be removeably connected to a computer 112 or can be neck hung or wrist mounted display or other suitable hands-free display. The TCFPD 100 receives its display signal from the computer via hardwire connection 111. Alternatively, in the embodiment of FIG. 3 or FIG. 4 the connection between the desktop computer 110 or the wearable computer 112 and the TCFPD may be a wireless connection utilizing a wireless communication protocol.

Figure 5:
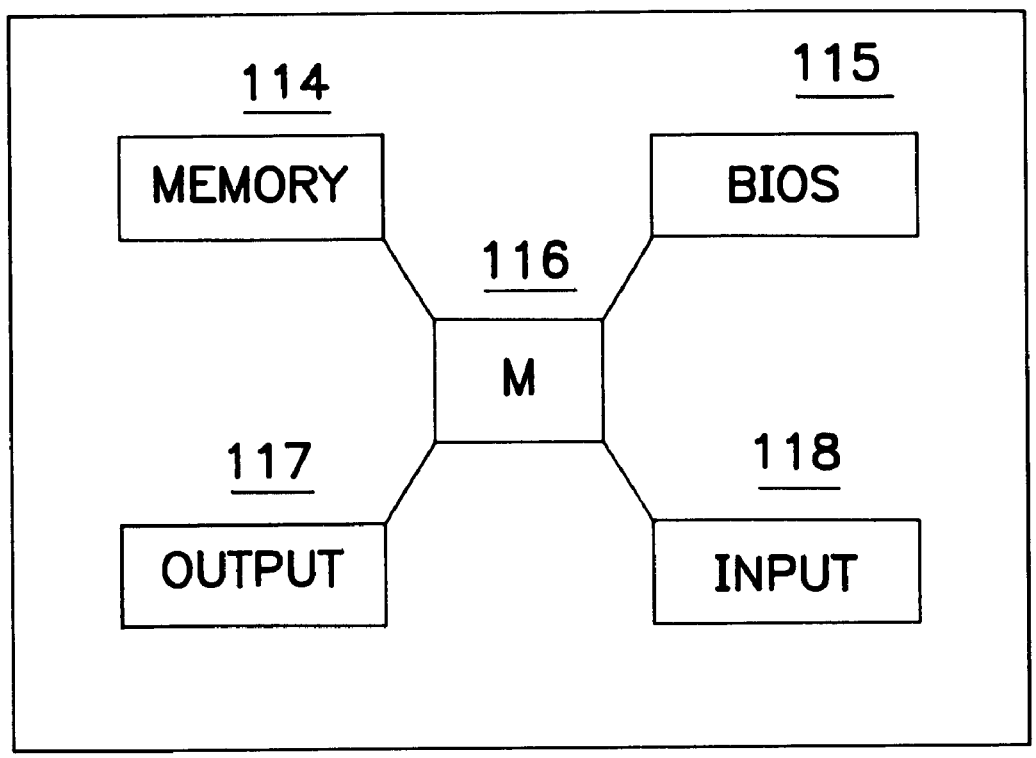
FIG. 5 illustrates an exemplary thin client motherboard and typical components.

FIG. 5 illustrates an exemplary thin client motherboard 113 such as would be utilized in order for it to support thin client functions in the TCFPD 100 of the present invention. The motherboard 113 is comprised of components such as volatile and non-volatile memory 114, a BIOS 115, a microprocessor 116, and output module 117 and an input module 118. One of ordinary skill in the art will appreciate and understand that the motherboard components may be added or deleted as desired without departing in spirit or scope from the present invention.

The preferred and optimumly preferred embodiments of the present invention have been described herein and shown in the accompanying drawing to illustrate the underlying principles of the invention, but it is to be understood that numerous modifications, designs, and alterations may be made without departing from the spirit and scope of this invention.

I claim:

1. A portable display device comprising:
   an enclosure;
   a first hardware means for enabling said display device to display output signals from a computer, said first hardware means residing in said enclosure;
   a second hardware means permitting said display device to function as a PDA, said second hardware means residing in said enclosure, said second hardware means further allowing said display device to function independently when not connected to or communicating with a computer;
   means for transferring any information obtained during independent operation to a fat client computer;
   activation means integral to said display device.

2. The device of claim 1 wherein said means for displaying output signals from a computer comprises an integral display screen and hardware for supplying video output generated by a computer to said display screen.

3. The device of claim 1 wherein said means for transferring any information comprises a wireless communication protocol and transceiver.

4. The device of claim 1 wherein said means for transferring any information comprises a physical connector which joins said display device to a computer.

5. The device of claim 1 wherein said activation means is a touch screen display, said touch screen being responsive to tactile stimulation, stylus stimulation and combinations thereof.

6. An apparatus for displaying computer video signals and functioning as a personal digital assistant, the apparatus comprising;
   means for displaying video signals output from a computer;
   means for communicating with a computer
   means for performing PDA-type functions, when not connected to or communicating with a computer, said functions including data entry and storage, scheduling, form entry, and data recovery,
   means for activation and control.

7. The method of claim 6 wherein said display device contains hardware to permit said device to function as an independent thin client computer with integral central processor.

8. The method of claim 6 wherein said display device contains communication means for communicating with another computer.

9. The apparatus of claim 6 wherein said means for activation and control is a touch screen display, said touch screen being responsive to tactile stimulation, stylus stimulation and combinations thereof.

10. The apparatus of claim 6 wherein said means for communicating includes wired or wireless communication means.

11. A method for displaying computer video output on a portable display device and for selectively operating as a PDA on same display device, the method comprising:

displaying computer video signals on a portable display device when said device is connected to or communicating with a computer, wherein said display device contains hardware to permit said display device to function as a computer display;

performing thin client functions with said display enclosure, said functions including scheduling, data entry and retrieval and form entry, when said display enclosure is not functioning as a display device for said computer.

* * * * *

UNITED STATES PATENT AND TRADEMARK OFFICE
Certificate

Patent No. 6,421,232                                                                            Patented: July 16, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hussein Sallam, Clarkesville, MD; and Steven L. Mizera, Silverado, CA.

Signed and Sealed this Seventeenth Day of December 2002.

DARREN SCHUBERG
*Supervisory Patent Examiner*
Art Unit 2835

UNITED STATES PATENT AND TRADEMARK OFFICE
CERTIFICATE OF CORRECTION

PATENT NO. : 6,421,232 B2
DATED : July 16, 2002
INVENTOR(S) : Sallam

It is certified that error appears in the above-identified patent and that said Letters Patent is hereby corrected as shown below:

Column 6,
Line 64, change "The method of claim 6" to -- The method of claim 11 --

Column 7,
Line 1, change "The method of claim 6" to -- The method of claim 11 --

Signed and Sealed this

Sixth Day of May, 2003

JAMES E. ROGAN
*Director of the United States Patent and Trademark Office*